United States Patent
Xie

(10) Patent No.: US 9,532,512 B2
(45) Date of Patent: Jan. 3, 2017

(54) SUPPORTING POLE AND MANUFACTURING METHOD THEREOF

(71) Applicant: CHANGZHOU TINGYUAN GARDEN PRODUCTS CO., LTD., Changzhou (CN)

(72) Inventor: Yunlong Xie, Changzhou (CN)

(73) Assignee: CHANGZHOU TINGYUAN GARDEN PRODUCTS CO., LTD., Changzhou (CN)

( * ) Notice: Subject to any disclaimer, the term of this patent is extended or adjusted under 35 U.S.C. 154(b) by 0 days.

(21) Appl. No.: 14/795,057

(22) Filed: Jul. 9, 2015

(65) Prior Publication Data

US 2016/0309665 A1 Oct. 27, 2016

(30) Foreign Application Priority Data

Apr. 21, 2015 (CN) .......................... 2015 1 0190496

(51) Int. Cl.
| | |
|---|---|
| *E04H 12/22* | (2006.01) |
| *A01G 17/04* | (2006.01) |
| *E04H 17/20* | (2006.01) |
| *B29D 23/00* | (2006.01) |
| *B29K 705/00* | (2006.01) |

(52) U.S. Cl.
CPC ............. *A01G 17/04* (2013.01); *B29D 23/001* (2013.01); *E04H 12/2215* (2013.01); *E04H 17/20* (2013.01); *B29K 2705/00* (2013.01)

(58) Field of Classification Search
USPC .......... 248/545, 156, 530, 532, 508; 29/253, 29/278, 271
See application file for complete search history.

(56) References Cited

U.S. PATENT DOCUMENTS

| | | | | | |
|---|---|---|---|---|---|
| 2,157,180 | A | * | 5/1939 | Little ...................... | H01R 4/66 174/6 |
| 3,305,985 | A | * | 2/1967 | Dean ..................... | E04H 12/223 256/47 |
| 3,522,707 | A | * | 8/1970 | Fuentes, Jr. ............... | E02D 5/20 405/251 |
| 2003/0089833 | A1 | * | 5/2003 | Hsu ..................... | E04H 12/2215 248/532 |

(Continued)

FOREIGN PATENT DOCUMENTS

| | | | | |
|---|---|---|---|---|
| CN | 2747858 | Y | 12/2005 | |
| CN | 103704054 | A | 4/2014 | |
| FR | 2920802 | A1 | * 3/2009 | ......... E04H 12/2215 |

*Primary Examiner* — Alfred J Wujciak

(74) *Attorney, Agent, or Firm* — Anova Law Group, PLLC

(57) ABSTRACT

The present invention provides a supporting pole. The supporting pole includes a metal inner pipe having an upper end and a lower end, with a reserved pipe portion on at least one of the upper end and the lower end. The supporting pole further includes an outer wrap layer wrapping the metal inner pipe except the reserved pipe portion, and a cone-shaped sleeve covering the reserved pipe portion. The reserved pipe portion has a plurality of axial grooves formed by a clamping and closing process that invigilates a wall of the reserved pipe portion, such that the reserved pipe portion has alternating protrusions and grooves. A maximum outer diameter of an open end of the reserved pipe portion is less than an outer diameter of the metal inner pipe. The cone-shaped sleeve is produced by injection molding.

10 Claims, 4 Drawing Sheets

(56) References Cited

U.S. PATENT DOCUMENTS

| | | | |
|---|---|---|---|
| 2004/0129855 A1* | 7/2004 | Chen .................... | E04H 17/263 248/545 |
| 2010/0005701 A1* | 1/2010 | Santiago ............... | A01K 97/10 43/21.2 |
| 2015/0096260 A1* | 4/2015 | Intagliata ............. | E04H 12/347 52/741.14 |

* cited by examiner

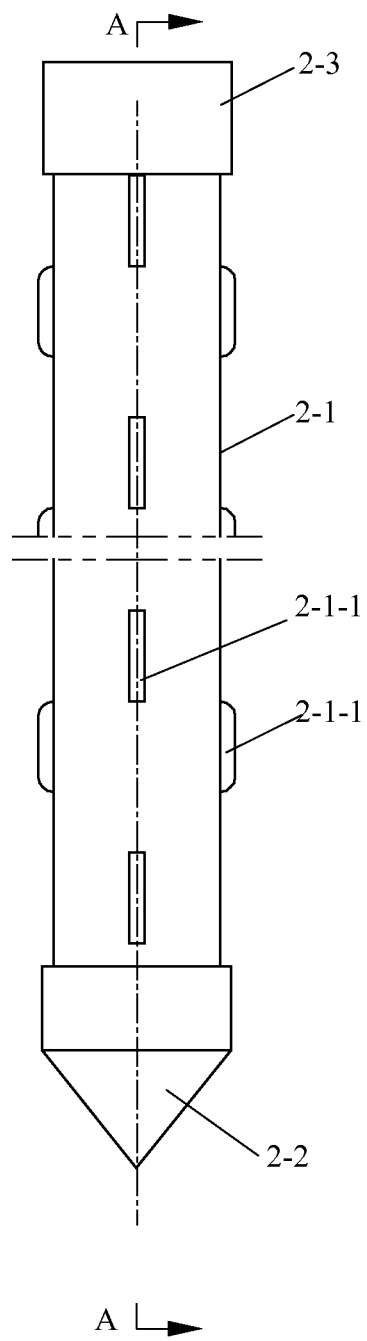
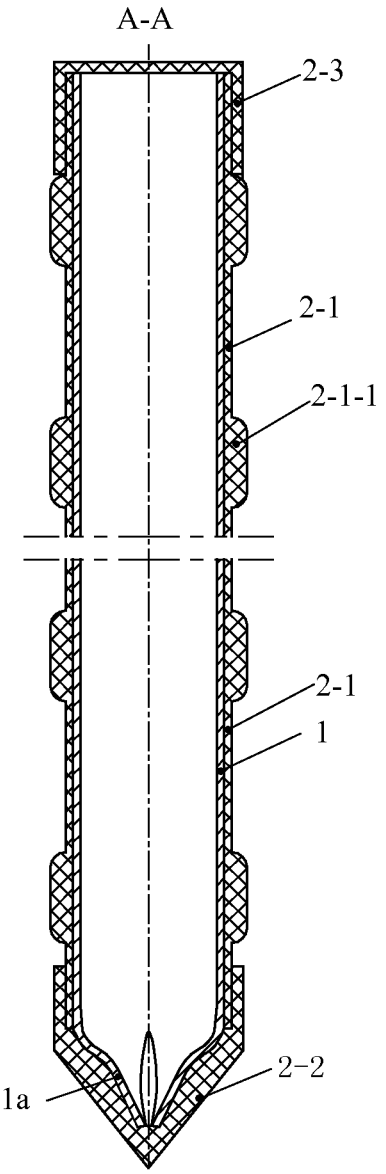
FIG. 1
FIG. 2

SUPPORTING POLE AND MANUFACTURING METHOD THEREOF

CROSS-REFERENCES TO RELATED APPLICATIONS

This application claims the priority of Chinese Patent Application No. 201510190496.8, entitled "Supporting Pole", filed on Apr. 21, 2015, the entire content of which is incorporated herein by reference.

FIELD OF THE DISCLOSURE

The present disclosure relates to the field of supporting pole structures, and, more particularly, relates to supporting poles for horticultural, agriculture, and other usages and a method for manufacturing supporting poles.

BACKGROUND

Supporting poles are often tied to stems of flowers, trees and other plants as supporting structures, or can be used to support or be a part of fences surrounding gardens, yards, or vegetable fields. However, current supporting poles, such as disclosed in Chinese Utility Model Application No. 200420062930.1 and Chinese Patent Application No. 201410011456.8, are often difficult to install or produce.

The disclosed method and system are directed to solve one or more problems set forth above and other problems.

BRIEF SUMMARY OF THE DISCLOSURE

One aspect of the present disclosure provides a supporting pole. The supporting pole may include a metal inner pipe having an upper end and a lower end, with a reserved pipe portion on at least one of the upper end and the lower end. The supporting pole may further include an outer wrap layer wrapping the metal inner pipe except the reserved pipe portion, and a cone-shaped sleeve covering the reserved pipe portion. The reserved pipe portion has a plurality of axial grooves formed by a clamping and closing process that invigilates a wall of the reserved pipe portion, such that the reserved pipe portion has alternating protrusions and grooves. A maximum outer diameter of an open end of the reserved pipe portion is less than an outer diameter of the metal inner pipe.

Another aspect of the present disclosure provides a method for manufacturing a supporting pole. The manufacturing method may include obtaining a metal inner pipe having an upper end and a lower end, with a reserved pipe portion on at least one of the upper end and the lower end. The metal inner pipe may be wrapped with an outer wrap layer except the reserved pipe portion. The reserved pipe portion may be clamped and closed with a multi-mold claw. A wall of the reserved pipe portion is invigilated such that the reserved pipe portion has alternating protrusions and grooves in an axial direction. A maximum outer diameter of an open end of the reserved pipe portion is less than an outer diameter of the metal inner pipe. Further, the method may include producing a cone-shaped sleeve for the reserved pipe portion.

BRIEF DESCRIPTION OF THE DRAWINGS

The following drawings are merely examples for illustrative purposes according to various disclosed embodiments and are not intended to limit the scope of the present disclosure.

FIG. 1 illustrates an external view of an exemplary supporting pole consistent with a first embodiment of the present disclosure;

FIG. 2 illustrates an A-A cross sectional view of the exemplary supporting pole in FIG. 1 consistent with embodiments of the present disclosure;

DETAILED DESCRIPTION

Figure 3:
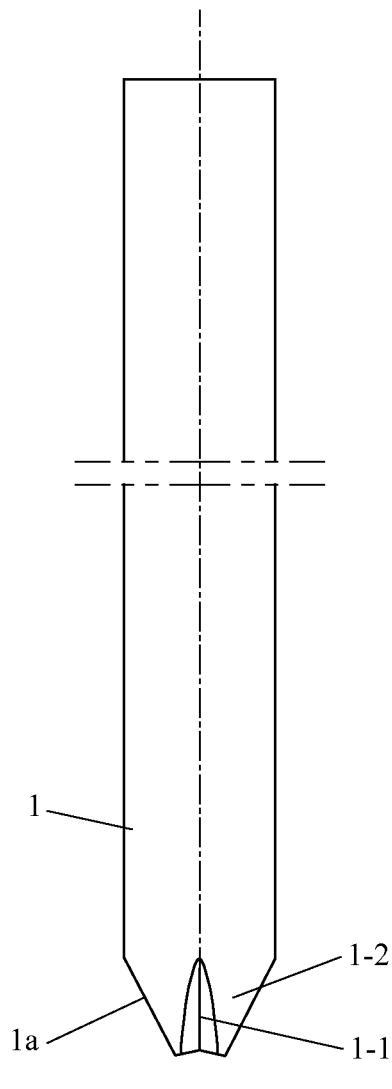
FIG. 3 illustrates an exemplary metal inner pipe consistent with embodiments of the present disclosure.
Figure 4:
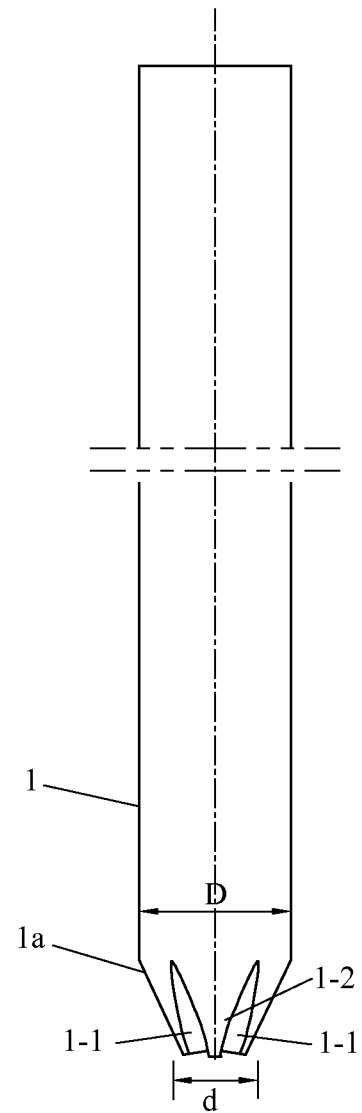
FIG. 4 illustrates a side view of the exemplary metal inner pipe in FIG. 3 consistent with embodiments of the present disclosure.
Figure 5:
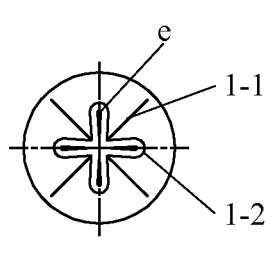
FIG. 5 illustrates a bottom view of the exemplary metal inner pipe in FIG. 4 consistent with embodiments of the present disclosure.

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

The present disclosure provides a supporting pole that has high structural strength and is easy to produce. The supporting pole has an inner metal pipe. The outer surface of the metal inner pipe is wrapped by a plastic layer. At least one end of the metal inner pipe is configured as a reserved pipe portion which is not wrapped by the plastic layer. The reserved pipe portion has a plurality of axial grooves formed by a clamping and closing operation that invigilates the wall of the reserved pipe portion, such that the reserved pipe portion has an irregularly shape with alternating protrusions and grooves. A maximum outer diameter of an open end of the reserved pipe portion is less than an outer diameter of the metal inner pipe. The reserved pipe portion has a cone-shaped plastic sleeve produced by injection molding. The number of the axial grooves on the reserved pipe portion may be 3, 4 or 6. The plastic layer may have protruding patterns.

Embodiment 1

As shown in FIGS. 1-5, a first embodiment of the present disclosure provides a supporting pole, including a metal inner pipe 1 and a plastic layer 2-1. The outer surface of the metal inner pipe 1 is wrapped by the plastic layer 2-1. That is, the metal inner pipe 1 is covered by an outer wrap layer 2-1, which may be made by plastic or other appropriate non-metal material(s). The metal inner pipe 1 may be a steel pipe.

The plastic layer 2-1 may be provided with protruding patterns 2-1-1. The protruding patterns 2-1-1 may not only give the supporting pole a desired appearance, but also facilitate plants to cling on. In some embodiments, the protruding patterns 2-1-1 may be a plurality of protrusions aligned intermittently on a plurality of axial lines on the supporting pole. For example, four axial lines on the supporting pole may be at 0 degree, 90 degree, 180 degree and 270 degree. The protrusions may be respectively scattered along the four lines according to various designs. The distance between neighboring protrusions on a same axial line may be the same or may be preconfigured according to various designs. The protrusions may have various sizes and shapes, such as cylinders, cones, truncated cones, cubes, cuboids or other appropriate shapes. In some embodiments, the protruding patterns 2-1-1 may be a plurality of protrusions aligned intermittently in a spiral fashion on the supporting pole.

The lower end of the metal inner pipe 1 may be configured as a reserved pipe portion 1a which is not wrapped by the plastic layer. The reserved pipe portion 1a may go through a clamping and closing process or operation on a specialized machine tool. That is, the lower end of the metal inner pipe 1 is closed by the clamping force to collapse the pipe wall in a controlled fashion, such as producing protrusions and grooves at the closed lower end of the metal inner pipe 1.

A four-claw mold may be used to clamp the reserved pipe portion 1a. The wall of the reserved pipe portion 1a may be invigilated and four axial grooves 1-1 may be formed thereon. Correspondingly, four protrusions 1-2 may be formed on the reserved pipe portion 1a. The four protrusions 1-2 may be wide at the top and narrow at the bottom. The end of reserved pipe portion 1a thus has an irregularly shape with alternating protrusions and grooves, although the reserved pipe portion 1a is generally in a cone shape. The maximum outer diameter d of the open end of the reserved pipe portion 1a is less than the outer diameter D of the metal inner pipe 1. In certain embodiments, a convergent gap e at the end of the closed reserved pipe portion may be as small as possible. In one embodiment, a desired end of the reserved pipe portion 1a may have no gap, i.e., the convergent gap e is approximately zero.

The reserved pipe portion 1a may have a cone-shaped plastic sleeve 2-2. The cone-shaped plastic sleeve 2-2 may be produced by injection molding. The upper part of the cone-shaped plastic sleeve 2-2 may surround the outside of the plastic layer 2-1. The cone-shaped plastic sleeve 2-2 and the plastic layer 2-1 may be integrated, as shown in FIG. 2.

Further, the top of the inner metal tube 1 may have a top cover 2-3. The top cover 2-3 may be produced using injection molding. The top cover 2-3 and the plastic layer 2-1 may also be integrated.

Embodiment 2

Figure 6:
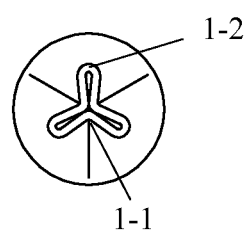
FIG. 6 illustrates a bottom view of an exemplary metal inner pipe consistent with a second embodiment of the present disclosure.

As shown in FIG. 6, the reserved pipe portion 1a may go through a clamping and closing operation on a specialized machine tool. A three-claw mold may be used to clamp the reserved pipe portion 1a. The wall of the reserved pipe portion 1a may be invigilated and three axial grooves 1-1 may be formed thereon. Correspondingly, three protrusions 1-2 may be formed on the reserved pipe portion 1a. The three protrusions 1-2 may be wide at the top and narrow at the bottom. Other structures of the supporting pole may be similar as the supporting pole described in Embodiment 1.

Embodiment 3

Figure 7:
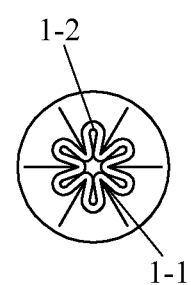
FIG. 7 illustrates a bottom view of an exemplary metal inner pipe consistent with a third embodiment of the present disclosure.

As shown in FIG. 7, the reserved pipe portion 1a may go through a clamping and closing operation on a specialized machine tool. A six-claw mold may be used to clamp the reserved pipe portion 1a. The wall of the reserved pipe portion 1a may be invigilated and six axial grooves 1-1 may be formed thereon. Correspondingly, six protrusions 1-2 may be formed on the reserved pipe portion 1a. The six protrusions 1-2 may be wide at the top and narrow at the bottom. Other structures of the supporting pole may be similar as the supporting pole described in Embodiment 1.

Embodiment 4

Figure 8:
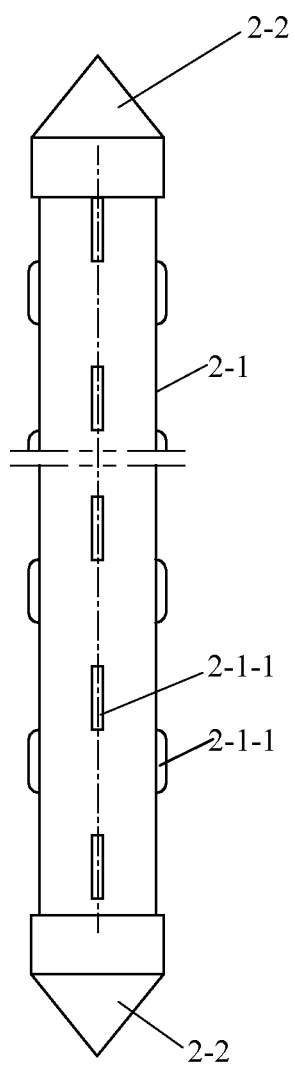
FIG. 8 illustrates an external view of an exemplary supporting pole consistent with a fourth embodiment of the present disclosure.

With references to FIGS. 1-7 and as shown in FIG. 8, the outer surface of the metal inner pipe 1 is wrapped by the plastic layer 2-1. The plastic layer 2-1 may be configured to have protruding patterns 2-1-1. Both ends of the metal inner pipe 1 may be configured as the reserved pipe bodies 1a which are not wrapped by the plastic layer. The reserved pipe bodies 1a at both ends may go through a clamping and closing operation. Number of axial grooves 1-1 formed on the reserved pipe bodies 1a may be 3, 4 or 6. The reserved pipe bodies 1a at both ends are thus irregularly shaped objects with alternating protrusions and grooves. The maximum outer diameters d of the open ends of the reserved pipe bodies 1a are less than the outer diameter D of the metal inner pipe 1. The reserved pipe bodies 1a at both ends of the metal inner pipe 1 may have cone-shaped plastic sleeves 2-2. The two cone-shaped plastic sleeves 2-2 may be produced using injection molding.

Figure 9:
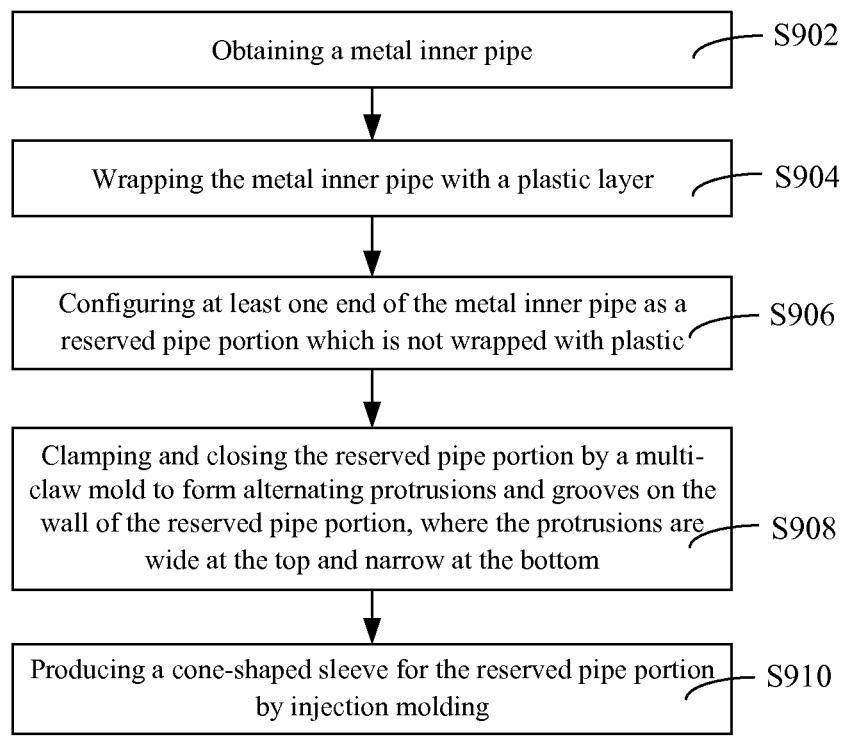
FIG. 9 illustrates an exemplary flow chart for producing a supporting pole consistent with embodiments of the present disclosure.

The present disclosure also provides a method for manufacturing a supporting pole. As shown in FIG. 9, an exemplary process for manufacturing a supporting pole may include producing a metal inner pipe 1 (S902). The cross-section of the metal inner pipe 1 may have various shapes, such as round, oval, rectangular or other appropriate shapes.

After the inner pipe 1 is provided, the outer surface of the metal inner pipe may be wrapped by a plastic layer 2-1 (S904). The plastic layer may have protruding patterns 2-1-1. In certain embodiments, a plastic extrusion machine may be used to produce and wrap customized plastic layer 2-1 to the metal inner pipe 1. In some embodiments, a long metal pipe may be obtained and wrapped with plastic layer. The long metal pipe may be cut into a plurality of pieces at desired lengths to produce a plurality of the metal inner pipes 1 wrapped with the plastic layers 2-1.

The metal inner pipe 1 has an upper end and a lower end. At least one of the upper end and the lower end may be configured as a reserved pipe portion 1a which is not wrapped by the plastic layer (S906). That is, the reserved pipe portion 1a is not wrapped, as the reserved pipe portion 1a is configured at either or both ends of the metal inner pipe 1.

Further, the reserved pipe portion 1a may go through a clamping and closing process on a specialized machine tool (S908). A multi-claw mold may be used to clamp the reserved pipe portion 1a. The wall of the reserved pipe portion 1a may be invigilated and a number of axial grooves 1-1 may be formed thereon. Correspondingly, same number of protrusions 1-2 may be formed on the reserved pipe portion 1a. The protrusions 1-2 may be wide at the top and narrow at the bottom. Therefore, after the clamping process, the reserved pipe portion 1a may generally have a cone shape with alternating protrusions and grooves.

The reserved pipe portion 1a may be placed in an injection molding machine where a cone-shaped plastic sleeve 2-2 may be produced by injection molding (S910). In certain embodiments, the cone-shaped plastic sleeve 2-2 and the reserved pipe portion 1a may fit tightly after the injection molding process such that they may not be manually separated. In some embodiments, during the injection molding process, an edge portion of the plastic layer 2-1 near the reserved pipe portion 1a may be melted, and the cone-shaped plastic sleeve 2-2 may be formed surround the edge portion of the plastic layer 2-1. Therefore, the plastic layer 2-1 may be integrated with the cone-shaped sleeve 2-2 (i.e. they may appear to be as one piece).

In one embodiment, the lower end of the metal inner pipe 1 may be the reserved pipe portion 1a with the cone-shaped sleeve 2-2. The upper end of the metal inner pipe may have a top cover 2-3 produced by injection molding (not shown). Further, during the injection molding process, an edge portion of the plastic layer 2-1 at the upper end of the metal inner pipe 1 may be melted and thus integrated with the top cover 2-3.

In another embodiment, both the upper end and the lower end of the metal inner pipe may be the reserved pipe portions 1a. The cone-shaped sleeves 2-2 may both be produced by injection molding.

In disclosed embodiments, the reserved pipe portion may have an irregularly shape with alternating protrusions and grooves. The maximum outer diameters of the open end of the reserved pipe body are less than the outer diameter of the metal inner pipe. The reserved pipe portion has a cone-shaped plastic sleeve produced by injection molding. With the alternating protrusions and grooves, the cone-shaped plastic sleeve and the reserved pipe portion may fit tightly together. The reserved pipe portion is metal, thus the combination of the reserved pipe portion and the cone-shaped plastic sleeve produced by injection molding may have desired strength and withstand great impact force.

The irregular shape of the reserved pipe portion may be obtained by a clamping process. The clamping process may be done in a machine shop, which facilitates the producing process. The disclosed supporting pole may suit to be produced in an assembly line, thus desired production efficiency may be achieved.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A supporting pole, comprising:
   a metal inner pipe having an upper end and a lower end, with a reserved pipe portion on at least one of the upper end and the lower end;
   an outer wrap layer wrapping the metal inner pipe except the reserved pipe portion; and
   a cone-shaped sleeve covering the reserved pipe portion, wherein:
   the reserved pipe portion has a plurality of axial grooves that invigilates a wall of the reserved pipe portion, such that the reserved pipe portion has alternating protrusions and grooves;
   a maximum outer diameter of an open end of the reserved pipe portion is less than an outer diameter of the metal inner pipe;
   at least three mold claws is used to clamp the reserved pipe portion; and the reserved pipe portion has at least three axial grooves and at least three protrusions arranged alternatingly, wherein the at least three is 3, 4 or 6.

2. The supporting pole according to claim 1, wherein:
   the cone-shaped sleeve is produced by injection molding.

3. The supporting pole according to claim 1, wherein:
   the outer wrap layer has protruding patterns and is made of plastic.

4. A method for manufacturing a supporting pole, comprising:
   obtaining a metal inner pipe having an upper end and a lower end, with a reserved pipe portion on at least one of the upper end and the lower end;
   wrapping the metal inner pipe with an outer wrap layer except the reserved pipe portion;
   clamping and closing the reserved pipe portion with a multi-mold claw; and
   producing a cone-shaped sleeve for the reserved pipe portion,
   wherein:
   a wall of the reserved pipe portion is invigilated such that the reserved pipe portion has alternating protrusions and grooves in an axial direction; and
   a maximum outer diameter of an open end of the reserved pipe portion is less than an outer diameter of the metal inner pipe.

5. The method according to claim 4, wherein:
   the cone-shaped sleeve is produced by injection molding.

6. The method according to claim 4, wherein:
   a three-mold claw is used to clamp the reserved pipe portion; and
   the reserved pipe portion has 3 axial grooves and 3 protrusions arranged alternatingly.

7. The method according to claim 4, wherein:
   a four-mold claw is used to clamp the reserved pipe portion; and
   the reserved pipe portion has 4 axial grooves and 4 protrusions arranged alternatingly.

8. The method according to claim 4, wherein:
   a six-mold claw is used to clamp the reserved pipe portion; and
   the reserved pipe portion has 6 axial grooves and 6 protrusions arranged alternatingly.

9. The method according to claim 4, wherein:
   the outer wrap layer has protruding patterns and is made of plastic.

10. The method according to claim 4, wherein:
    the outer wrap layer is produced by a plastic extrusion machine.

* * * * *